United States Patent
Bhogal et al.

(10) Patent No.: US 8,959,162 B2
(45) Date of Patent: *Feb. 17, 2015

(54) PUBLISHER-BASED MESSAGE DATA CASHING IN A PUBLISH-SUBSCRIPTION ENVIRONMENT

(75) Inventors: Kulvir S. Bhogal, Pflugerville, TX (US); Martin J. Gale, Hampshire (GB); Rick A. Hamilton, II, Charlottesville, VA (US); Andrew R. Jones, Round Rock, TX (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/032,989

(22) Filed: Feb. 23, 2011

(65) Prior Publication Data

US 2012/0215832 A1 Aug. 23, 2012

(51) Int. Cl.
*G06F 15/16* (2006.01)
*G06F 9/54* (2006.01)
(Continued)

(52) U.S. Cl.
CPC ............ *G06F 9/542* (2013.01); *H04L 12/1859* (2013.01); *H04L 51/18* (2013.01)
USPC ............ 709/206; 709/246; 709/235; 709/234

(58) Field of Classification Search
CPC ...... G06F 9/542; H04L 51/18; H04L 12/1859
USPC ........................... 709/204–206, 246, 235, 234
See application file for complete search history.

(56) References Cited

U.S. PATENT DOCUMENTS

| 7,266,826 B2 | 9/2007 | Katiyar et al. |
| 7,406,537 B2 | 7/2008 | Cullen |
| 7,437,417 B2 | 10/2008 | Reynolds et al. |

(Continued)

FOREIGN PATENT DOCUMENTS

| CN | 1201582 A | 12/1998 |
| CN | 101193078 A | 6/2008 |
| CN | 101729354 A | 6/2010 |

OTHER PUBLICATIONS

Maitland, J., "Keeping Control Isn't Easy", Chapter 4: Cloud-Based Infrastructure, SearchCloudComputing.com, 13 pages; entered into Application on Apr. 13, 2011.

(Continued)

*Primary Examiner* — Kenneth Coulter
(74) *Attorney, Agent, or Firm* — William E. Schiesser; Maxine L. Barasch; Keohane & D'Alessandro PLLC

(57) ABSTRACT

An approach for caching potentially repetitive message data in a publication/subscription messaging environment is provided. Specifically, when a message is received on a broker system from a publisher system, the broker system analyzes the message for potentially repetitive data. Once such a set of data has been identified, a unique identifier/key corresponding thereto will be sent back to the publisher system and the set of data will be stored in a (data) cache. Upon receipt, the publisher system will cache/store the unique identifier in a (key) cache. Then, when the publisher system generates a future message that would contain the same set of data, the publisher system will substitute the unique identifier (as retrieved from the key cache) for the set of data to yield an abbreviated/truncated message.

25 Claims, 5 Drawing Sheets

(51) Int. Cl.
*H04L 12/18* (2006.01)
*H04L 12/58* (2006.01)

(56) References Cited

U.S. PATENT DOCUMENTS

| | | | |
|---|---|---|---|
| 7,519,546 | B2 | 4/2009 | Murren et al. |
| 7,574,500 | B2 * | 8/2009 | Roddy .................. 709/223 |
| 7,587,450 | B2 | 9/2009 | Morris |
| 7,698,372 | B2 | 4/2010 | Codignotto |
| 2003/0115291 | A1 | 6/2003 | Kendall et al. |
| 2006/0047666 | A1 | 3/2006 | Bedi et al. |
| 2006/0146999 | A1 | 7/2006 | Thompson et al. |
| 2006/0149840 | A1 | 7/2006 | Thompson et al. |
| 2006/0167897 | A1 | 7/2006 | Jones et al. |
| 2006/0168331 | A1 | 7/2006 | Thompson et al. |
| 2006/0184656 | A1 * | 8/2006 | Roddy .................. 709/223 |
| 2007/0043824 | A1 * | 2/2007 | Fremantle ............. 709/214 |
| 2007/0153783 | A1 | 7/2007 | Walsh |
| 2009/0228563 | A1 | 9/2009 | Jones et al. |

OTHER PUBLICATIONS

Mell et al., "The NIST Definition of Cloud Computing", National Institute of Standards and Technology, Information Technology Laboratory, Version 15, Oct. 7, 2009, 2 pages.

Yuhui Fei, PCT Notification of Transmittal of the International Search Report and the Written Opinion of the International Searching Authority, or the Declaration, International Application No. PCT/IB2012/050762, Date of Mailing Jul. 19, 2012, 6 pages.

* cited by examiner

PUBLISHER-BASED MESSAGE DATA CASHING IN A PUBLISH-SUBSCRIPTION ENVIRONMENT

TECHNICAL FIELD

The present invention relates to publish-subscription (pub/sub) environments. Specifically, the present invention relates to an approach for caching potentially repetitive data in a pub/sub environment.

BACKGROUND

Publish-subscription (pub/sub) messaging patterns are communication models used in many different industries today. For example, pub/sub is used in banking systems, weather systems, and other systems that require techniques to notify multiple entities of common information. In general, pub/sub is a messaging paradigm where senders (publishers) of messages typically are not programmed to send their messages to specific receivers (subscribers). Rather, published messages can be characterized into classes, without knowledge of what (if any) subscribers there may be. Subscribers express interest in one or more classes and can receive messages that are of interest, without knowledge of what publishers there are. This decoupling of publishers and subscribers can allow for greater scalability and a more dynamic network topology.

One deficiency in pub/sub models is that all of the content (i.e., the body/payload of the message) is sent to all users, and thus the amount of network traffic generated from the publisher is, in the simplest form, the size of the message multiplied by the number of subscribers. Moreover, it can be common for the same set of data to be re-sent multiple times (in different messages) to the same subscriber(s). As such, the volume of the data generated can be large and consume a great deal of network bandwidth.

SUMMARY

In general, embodiments of the present invention provide an approach for a broker-assisted, publisher side cache that can be utilized to reduce a volume of data (e.g., network traffic) delivered between a publisher and broker in a publication/subscription (pub/sub) environment. Specifically, in a typical embodiment, when a message is received on a broker system from a publisher system, the broker system analyzes the message for potentially repetitive data. Such data can be determined from historical messages (e.g., determining that a certain set of data appeared in multiple messages and is thus flagged in a database or the like), a set of rules (e.g., if data set "Y" appears, flag it as potentially repetitive), etc. Regardless, once such a set of data has been identified, a unique identifier/key corresponding thereto will be sent back to the publisher system and the set of data will be stored in a (data) cache. Upon receipt, the publisher system will cache/store the unique identifier in a (key) cache. Then, when the publisher system generates a future message that would contain the same set of data, the publisher system will substitute the unique identifier (as retrieved from the key cache) for the set of data to yield an abbreviated/truncated message. The abbreviated message would be sent to the broker system, which would: analyze the message; locate the unique identifier; retrieve the corresponding set of data from the (data) cache; replace the unique identifier with the set of data to yield a completed message; and then send the completed message to relevant subscriber system(s).

A first aspect of the present invention provides a method for caching potentially repetitive message data in a publish-subscription (pub/sub) messaging environment, comprising: identifying a set of data in a first message received on a broker system from a publisher system, the set of data having a potential to appear in at least one future message; sending a unique identifier corresponding to the set of data from the broker system to the publisher system, the unique identifier identifying the set of data as cacheable; receiving a second message on the broker system from the publisher system, the second message having the unique identifier; retrieving the set of data from a cache; replacing the unique identifier in the second message with the set of data to yield a completed message; and sending the completed message to a subscriber system.

A second aspect of the present invention provides a system for caching potentially repetitive message data in a publish-subscription (pub/sub) messaging environment, comprising: a first bus; a first processor coupled to the first bus; and a first memory medium coupled to the first bus, the first memory medium comprising instructions to: identify a set of data in a first message received on a broker system from a publisher system, the set of data having a potential to appear in at least one future message; send a unique identifier corresponding to the set of data from the broker system to the publisher system, the unique identifier identifying the set of data as cacheable; receive a second message on the broker system from the publisher system, the second message having the unique identifier; retrieve the set of data from a cache; replace the unique identifier in the second message with the set of data to yield a completed message; and send the completed message to a subscriber system.

A third aspect of the present invention provides at least one computer program product for caching potentially repetitive message data in a publish-subscription (pub/sub) messaging environment, the at least one computer program product comprising at least one computer readable storage media, and program instructions stored on the at least one computer readable storage media, to: identify a set of data in a first message received on a broker system from a publisher system, the set of data having a potential to appear in at least one future message; send a unique identifier corresponding to the set of data from the broker system to the publisher system, the unique identifier identifying the set of data as cacheable; receive a second message on the broker system from the publisher system, the second message having the unique identifier; retrieve the set of data from a cache; replace the unique identifier in the second message with the set of data to yield a completed message; and send the completed message to a subscriber system.

A fourth aspect of the present invention provides a method deploying a system for caching potentially repetitive message data in a publish-subscription (pub/sub) messaging environment, comprising: deploying at least one computer infrastructure being operable to: identify a set of data in a first message received on a broker system from a publisher system, the set of data having a potential to appear in at least one future message; send a unique identifier corresponding to the set of data from the broker system to the publisher system, the unique identifier identifying the set of data as cacheable; receive a second message on the broker system from the publisher system, the second message having the unique identifier; retrieve the set of data from a cache; replace the unique identifier in the second message with the set of data to yield a completed message; and send the completed message to a subscriber system.

BRIEF DESCRIPTION OF THE DRAWINGS

These and other features of this invention will be more readily understood from the following detailed description of the various aspects of the invention taken in conjunction with the accompanying drawings in which.

Figure 1:
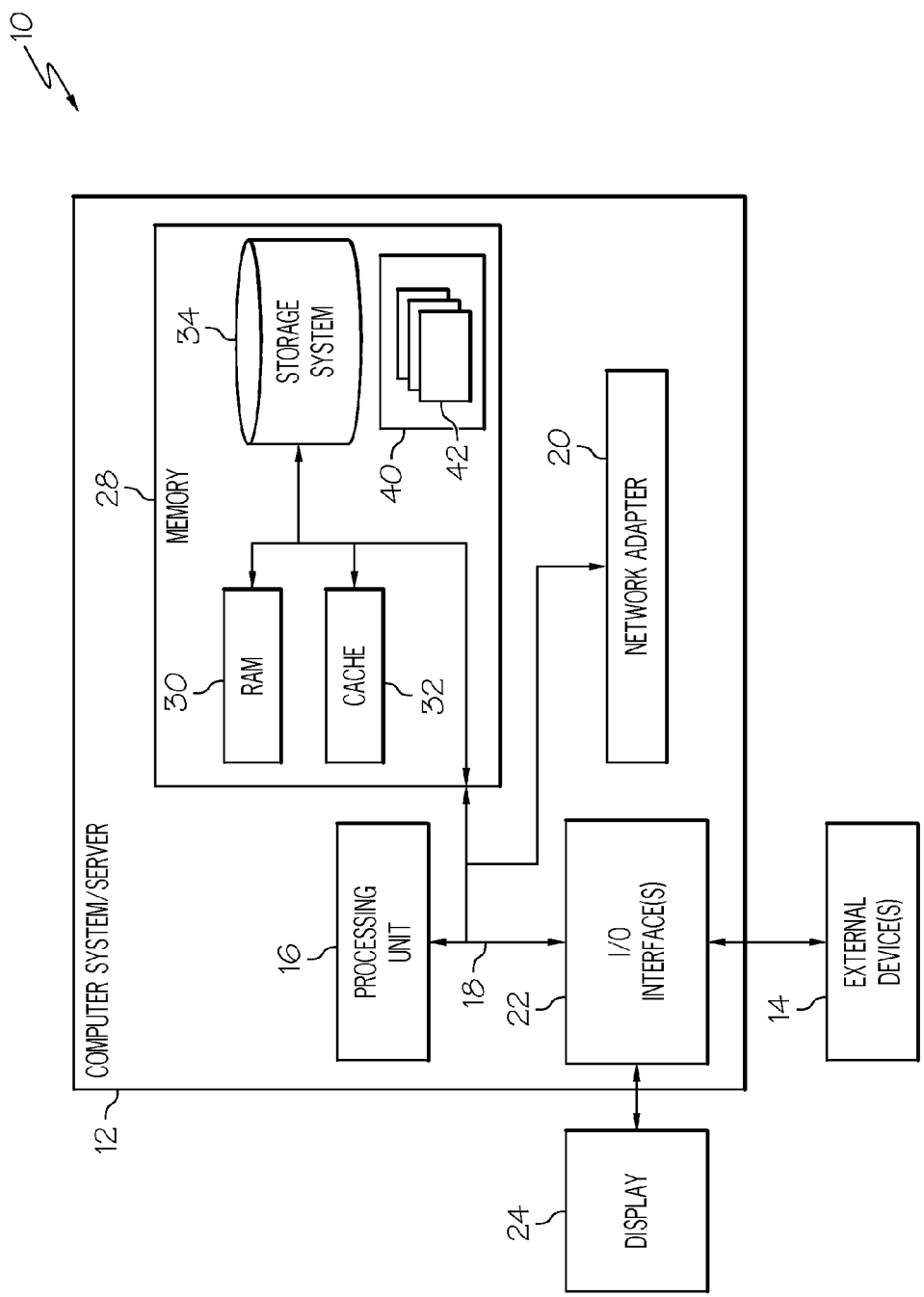
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for a broker-assisted, publisher side cache that can be utilized to reduce a volume of data (e.g., network traffic) delivered between a publisher and broker in a publication/subscription (pub/sub) environment. Specifically, in a typical embodiment, when a message is received on a broker system from a publisher system, the broker system analyzes the message for potentially repetitive data. Such data can be determined from historical messages (e.g., determining that a certain set of data appeared in multiple messages and is thus flagged in a database or the like), a set of rules (e.g., if data set "Y" appears, flag it as potentially repetitive), etc. Regardless, once such a set of data has been identified, a unique identifier/key corresponding thereto will be send back to the publisher system and the set of data will be stored in a (data) cache. Upon receipt, the publisher system will cache/store the unique identifier in a (key) cache. Then, when the publisher system generates a future message that would contain the same set of data, the publisher system will substitute the unique identifier (as retrieved from the key cache) for the set of data to yield an abbreviated/truncated message. The abbreviated message would be sent to the broker system, which would: analyze the message; locate the unique identifier; retrieve the corresponding set of data from the (data) cache; replace the unique identifier with the set of data to yield a completed message; and then send the completed message to relevant subscriber system(s).

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. In general, program/utility 40 performs the function of the present invention as described herein. Each of the operating systems, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22.

Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Embodiments of the present invention provide an approach for a publisher-side cache that can be utilized to reduce the volume of data (network traffic) delivered to individual subscribers in a pub/sub system.

Figure 2:
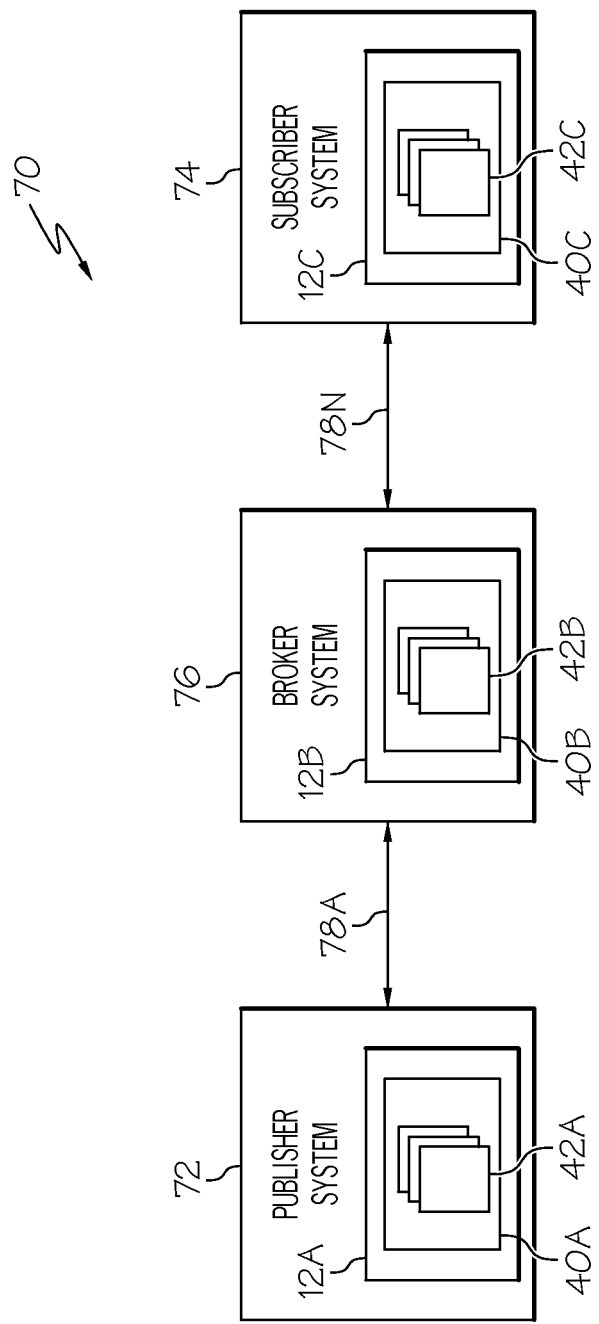
FIG. 2 depicts a pub/sub environment according to an embodiment of the present invention.

Referring now to FIG. 2, a pub/sub environment 70 in accordance with at least one embodiment of the present invention is shown in greater detail. As depicted, environment 70 comprises a publisher system 72 (also referred to below as "publisher") in communication with a subscriber system 74 (also referred to below as "subscriber") via a broker system 76 (also referred to below as "broker"). Systems 72, 74, and 76 communicate via network links 78A-N, which can represent any type of network links and/or communication networks now known or later developed. It is understood that publisher system 72, subscriber system 74, and broker system 76 each comprise one or more computer systems 12A-C (e.g., which comprises components/elements similar to computer system 12 of FIG. 1). As such, publisher system 72, subscriber system 74, and broker system 76 can each comprise a program/utility 40A-C that enable corresponding functions thereof. Specifically, publisher system 72 comprises publisher program 40A having a set (at least one) of publisher program modules 42A, broker system 76 comprises broker program 40B having a set of broker program modules 42B, and subscriber system 74 comprises a subscriber program 40C having a set of subscriber program modules 42C. Program modules 42A-C of programs 40A-C typically enable/perform the functions that will be described below in conjunction with FIGS. 3-5.

Figure 3:
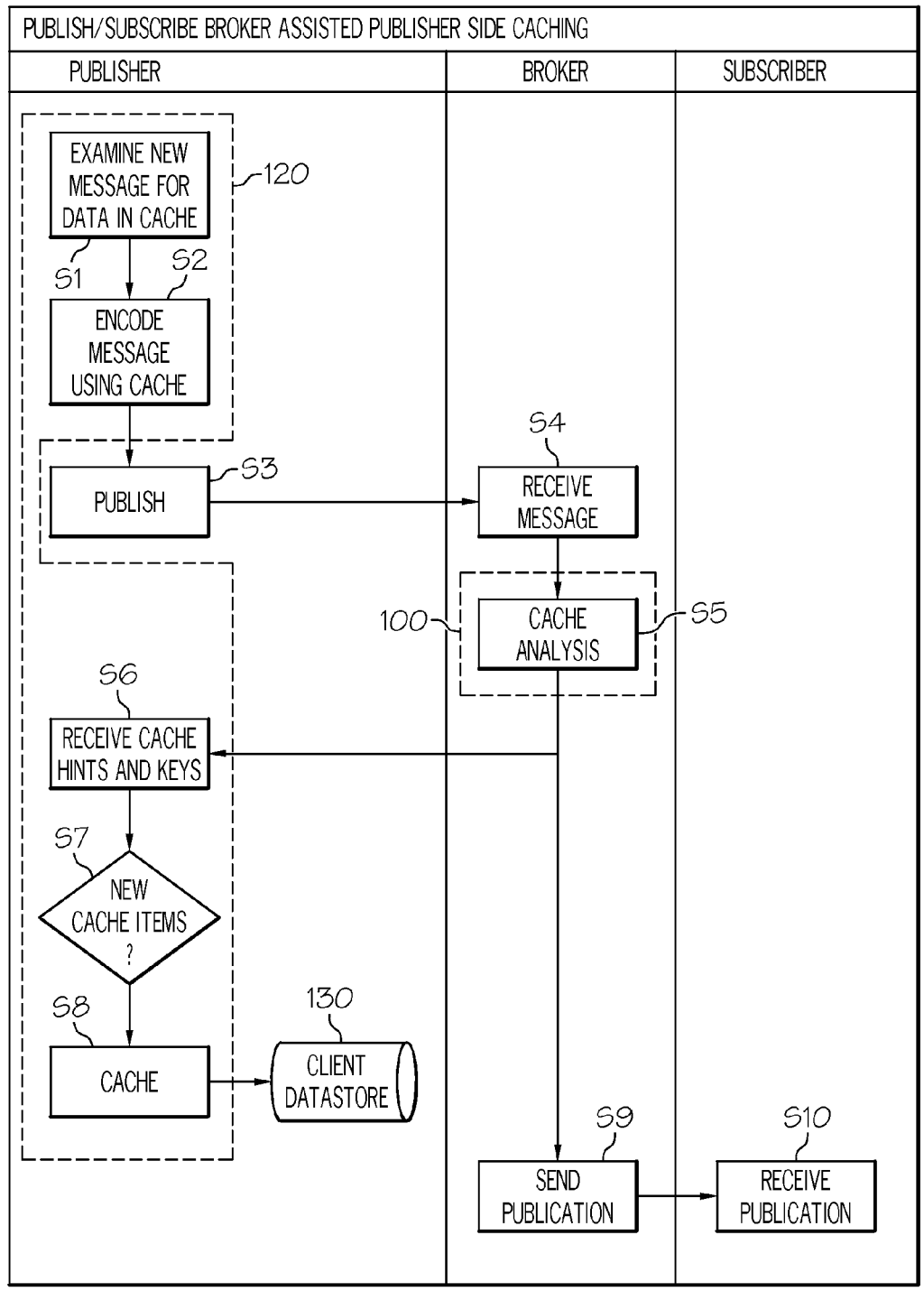
FIG. 3 depicts a component flow diagram according to an embodiment of the present invention.

Referring now to FIG. 3, a component flow diagram illustrating the process involved with a broker-assisted, publisher-based cache approach for a publish/subscribe system is shown in greater detail. It is noted, that for initial purposes, the process will start at step S3 as steps S1 and S2 depend on the publisher's cache already being in place. As such steps S1 and S2 will be further described below. In step S3, a publisher system sends a message to be published to a broker system. The broker system receives the message in step S4, and passes it to the caching engine 100 (described in greater detail below). In general, caching engine 100 will perform a cache analysis in step S5 whereby it is determined whether the message comprises a set of potentially repetitive data, which can be cached accordingly. In one embodiment, cache engine 100 could identify data (binary, text, etc.) that should be cached. Along these lines, cache engine 100 can use intelligent rules to identify likely data that will be used repeatedly in messages sent pursuant the applicable subscription as publications/messages are received from publishers in step S4. The functions provided by cache engine 100 are described in more detail in FIG. 4.

Once processed, a cache message about future items to be cached is sent from the broker system to the publisher system. In addition, as will be discussed in conjunction with FIG. 4, the set of data and the unique identifier/cache keys are cached in a data cache (140 of FIG. 4) that is accessible to the broker system. The initial message received in step S4 will then be sent to relevant subscribers in steps S9 and S10. In general, the cache message sent from the broker system to the publisher system will identify the set of data that was cached and a unique identifier/key that refers specifically to the set of data. As such, one element of this approach is the creation of the unique identifier. In this embodiment, the cache and the unique identifiers created could be specific to the publisher or to all publishers handled by the broker system (one or more topics), etc.

In step S6, the cache message (e.g., including hints and/or keys/unique identifiers) received from the broker system and is processed by publisher cache engine 120 in step S7. If the message contains new information about data to be cached, the unique identifier (and optionally the data) is stored in publisher cache 130 in step S8. This information is then used in steps S1 and S2 when a new message is being prepared to be published to the broker system. In step S1, the new message is examined for data that matches data in the cache. If cached data is found in the new message, the message is encoded in step S2 using the cache keys/unique identifiers to yield an encoded and abbreviated/truncated message (per a method such as those described in the Illustrative Implementation sections below). That new encoded message is then published to the broker system in steps S3 and S4 where cache engine 100 will perform a cache analysis in step S5. This analysis is shown in FIG. 4

Figure 4:
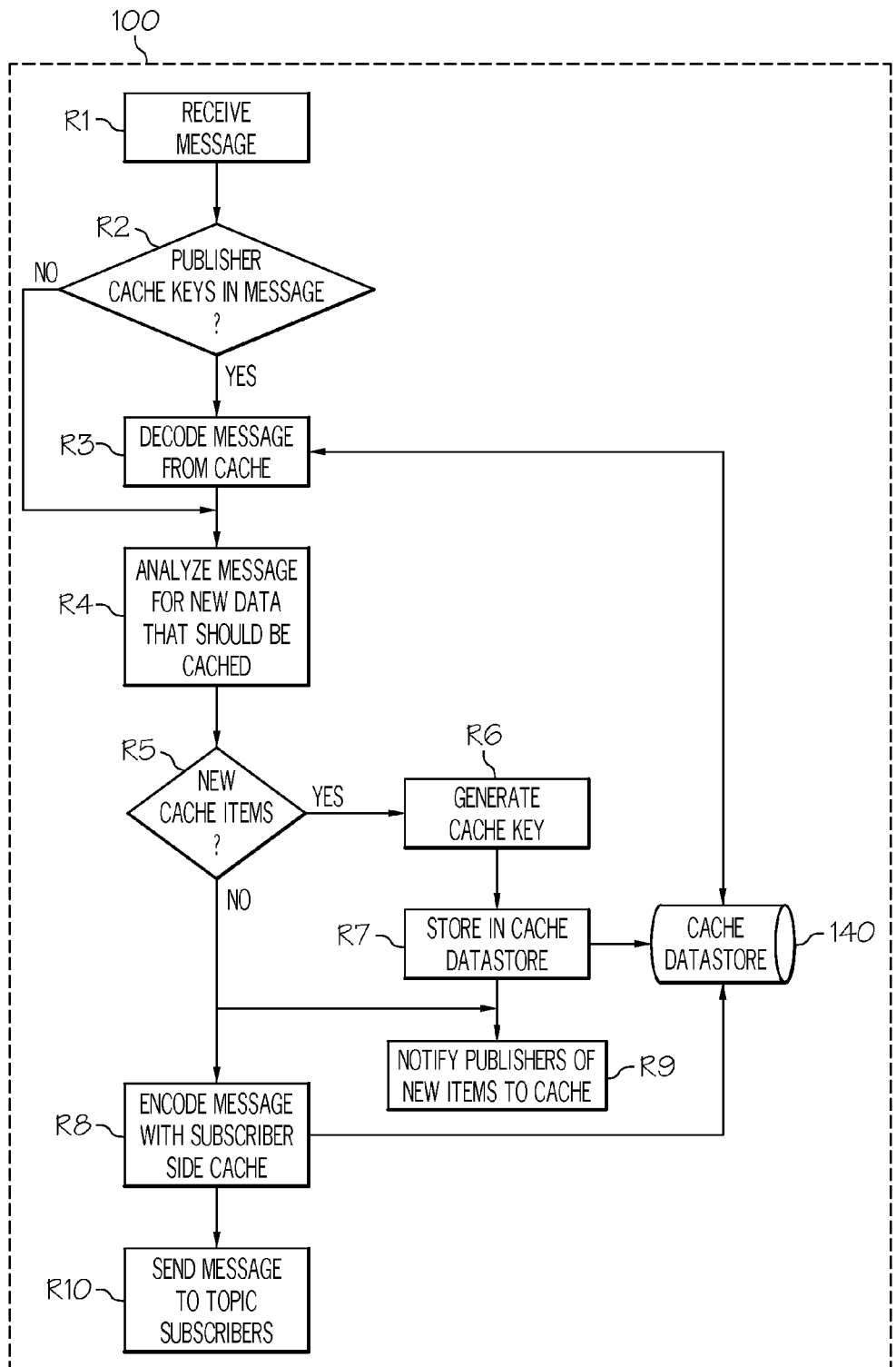
FIG. 4 depicts another component flow diagram according to an embodiment of the present invention.

Specifically, FIG. 4 shows the basic flow of the broker cache engine 100. As shown, a new message is received in step R1 and examined in step R2 to determine if there are existing cache keys in the received message. If so, it decodes the message in step R3 by: accessing data cache, retrieving the set of data corresponding to the unique identifier received in the message in step R1, replacing the unique identifier in the message with the retrieved set of data to yield a completed message; and sending the completed message to the applicable subscribers such as in steps S9 and S10 of FIG. 3. Alternatively, broker cache engine 100 can pass the abbreviated message to the subscriber systems. As such, the subscriber system could also maintain a cache of potentially repetitive data. In such a case, the subscriber system would receive the abbreviated message, locate the unique identifier, and replace the same with the data from cache to yield the completed message. This latter embodiment thus reduces the number of times the same data set will be transmitted. Also, with shorter messages being sent between the publisher system, the broker system, and the subscriber system, network bandwidth is conserved.

In step R4, broker cache engine 100 will also analyze the message received in step R1 for data that can be cached/is potentially repetitive (e.g., does the message contain data that may also be contained in at least one future message). Along these lines, step R4 can entail one or more algorithms for determining what data should be cached. This may include rules such as historical analysis (have the same text in "N" of the last "M" messages), predefined knowledge about expected messages (e.g. messages using known schemas), etc. Once the algorithms are applied and cacheable data is identified in step R5, the unique identifiers/cache keys are created in step R6 for each data fragment and stored in the broker cache 140 in step R7. The publisher system is then notified in step R9 of the new data that should be cached and what key should be used in future publications. In steps R8 and R10, the completed message itself can be sent to subscribers or the truncated/abbreviated message could be passed along to the subscriber systems themselves.

It is understood that it may be beneficial to allow a broker system to invalidate cache items on a publisher system and/or a subscriber system. If, for example, the broker's cache engine can determine that data previously cached is never used again, or has a very low likelihood of being used again, it may send an invalidation message upon the next publish to the other system(s). This may be implemented as a custom header that contains the key and an invalidate directive. The subscriber system and/or publisher system, upon receiving and reading the message, will simply remove the cached item from its cache.

Additional aspects of the system:
The caches 130 (FIG. 3) and/or 140 (FIG. 4) illustrated above can be either in-memory or an on-disk data store (e.g. database like DB2, flat file, binary file, binary encrypted file, etc).
The broker system's cache engine 100 may attach an expiration for each key. This value could be used by the subscriber system's or publisher system's caches to invalidate cache entries. This may be useful to limit the growth of the cache.
The broker system could send a subsequent message (to both publisher systems and subscriber systems) that would invalidate certain cache entries (e.g. it determines that data will never be used again).
The broker system's cache engine 100 can support automatic cache creation as described earlier, for example, if the last "N" number of messages on a topic contains a common data segment, then that data segment should be marked for caching and a cache key/data pair created and sent with the next message.

Illustrative Implementations
Illustrative Implementation I
As the broker system identifies data to be cached, when it creates a message that contains data that should be in the client's cache, engine 100 either deletes or substitutes the cached data with the appropriate cache key (the system that allows for the data to be deleted is described below). For example, assume that the message being sent appears as follows:
AAAAAABBBBBBBCCCCCCDDDDDDEEEEEEE
The broker system indicates that the "B's" of the message will likely be used in future messages and instructs subscribers (both publishers and subscriber systems) that both should retain that portion (i.e., the B's) in their local cache. In this example, the broker system informs subscriber that they need to refer to this portion BBBBBBBB as ~rp1. How to identify repeated portions may be user specifiable and the escape sequences to identify repeated portions will be user specifiable as well. The subscriber will store the portion BBBBBBB and analyze incoming messages for the presence of ~rp1.

Further assume that at some future point in time, a publisher wants to send a message that appears as follows:
FFFFFFFFBBBBBBBUUUUUUJJJJJJJ
Rather than sending this message, it can now send the following:
FFFFFFFF~rp1UUUUUUJJJJJJJ
This allows for the sender to send less traffic on the network. Upon receipt of this message, the subscriber will then reconstruct the message based on translation information from its cache and create the following message:
FFFFFFFFBBBBBBBUUUUUUJJJJJJJ
After expanding ~rp1 to BBBBBBB.

Illustrative Implementation II
If it was desired, for example, that cached data be inserted at the 12th position of the message, then a property (or custom header) would be provided that indicates rp1=12,x,y (where rp1 is the cache key, and 12 is the first position to insert the data, x is the next, y is the next, and so on). This method prevents having to escape (i.e., eliminate) any un-cached message data that matches a cache indicator.

Illustrative Implementation III
Another possible storage key mechanism is the use of Cyclic Redundancy Check (CRC) or similar technologies. By publishing the repeating data field, and an indication that this is a repeating (e.g., cacheable) field, the broker system may likewise either send the CRC or allow the subscriber system to calculate that data field's CRC. Subsequent cache retrieval instructions can be made by using this CRC as a unique identifier of the cacheable data to be retrieved.

Under embodiments of the present invention, multiple approaches may be included in these solutions. Specifically, several techniques may be implemented to identify cacheable information. The techniques identified below may be used independently or in conjunction with each other.

Differencing Engine: This approach analyzes messages either within a single topic, or across multiple topics capturing the similarities between messages. The most similar aspects of the messages are good candidates for future caching. The similarities captured may be persisted across restarts such that caching efficiency is not interrupted. The items cached may change over time as the message profiles change. For example if one type of message is dominant for a period of time, then a second disparate message type is dominant, cache entries related to the first type may be invalidated to make room for the second type.

Rate-Based Selection: It may be common for some messages and topics to have a higher rate of publishing than others. This rate may be related to the importance or the dynamic nature of the subject for each particular topic. Topics with a higher publication rates should be selected for caching before topics with a lower publication rate. Rate-based selection counts the total number of messages per topic, or message types within a single topic, and selects the most published topics or message types for message portion caching.

Message Correlation Selection: The system may discern correlations between related topics and therefore cache the potential similarities for the related topics upon detection of the first message. For example, there may be related topics of /scores/[court]/and /stats/[court] where court is a changing topic related to particular players on a particular cart. Every message published to a /stats/[court] is preceded by a message published to /scores/[court]. Both sets of messages may identify the player names for that particular court. Therefore, this method may discern that for every message published to /scores/[court] and /stats/[court] that while components of the message change (current score, current stats) the player names stay the same. Therefore, for a short period of time after a message is published to /scores/[court] the player name component is eligible for caching until the corresponding /stats/[court] message is sent.

Finally, it is noted that different methods of signifying data entities may be used by both senders and recipients of data. These methods include universal hashing, hashing with checksums, rolling hashes, or even cryptographic hash functions, should security dictate. Each of these approaches offers certain advantages and can be used to speed and ease the implementation of any concepts described in this disclosure.

Figure 5:
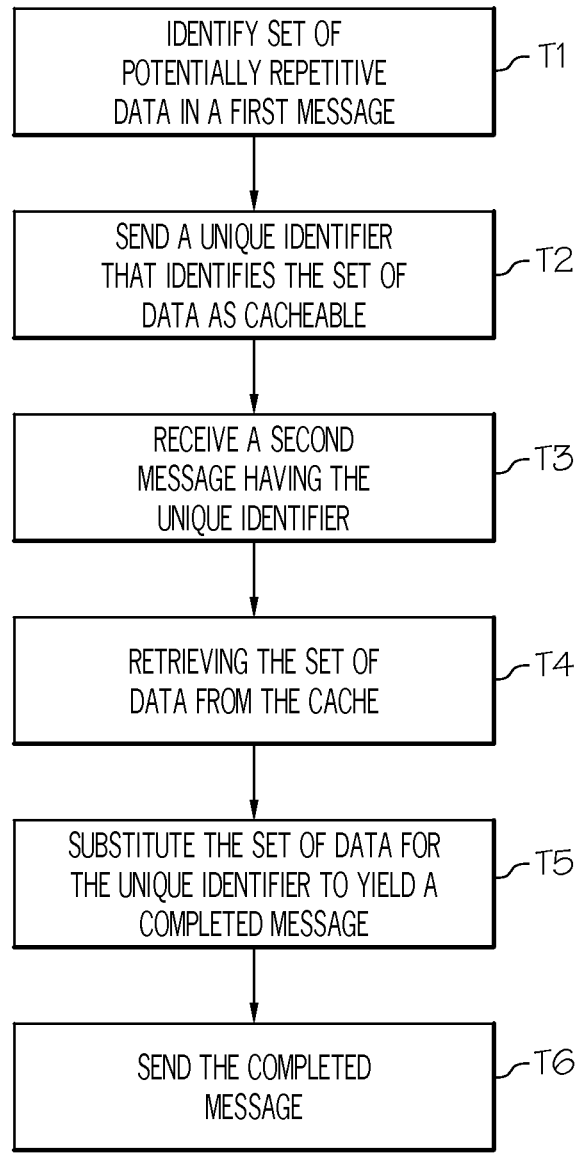
FIG. 5 depicts a method flow diagram according to an embodiment of the present invention.

Referring now to FIG. 5, a method flow diagram according to an embodiment of the present invention is shown. In step T1, a set of data is identified in a first message received on a broker system from a publisher system, the set of data having a potential to appear in at least one future message. In step T2, a unique identifier corresponding to the set of data is sent from the broker system to the publisher system, wherein the unique identifier identifies the set of data as cacheable. In step T3, a second message is received on the broker system from the publisher system, the second message having the unique identifier. In step T4, the set of data is retrieved from a cache. In step T5, the unique identifier is replaced in the second message with the set of data to yield a completed message. In step T6, the completed message is sent to a subscriber system.

While shown and described herein as data caching solution, it is understood that the invention further provides various alternative embodiments. For example, in one embodiment, the invention provides a computer-readable/useable medium that includes computer program code to enable a computer infrastructure to provide data caching functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data caching functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing data caching functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for caching potentially repetitive message data in a publish-subscription (pub/sub) messaging environment, comprising:
    evaluating a publication rate of messages pertaining to a set of topics;
    identifying a set of data in a first message received on a broker system from a publisher system, the set of data having a potential to appear in at least one future message based on the set of data pertaining to at least one topic of the set of topics, the at least one topic of the set of topics having a higher publication rate than other topics of the set of topics;
    sending a unique identifier corresponding to the set of data from the broker system to the publisher system and a subscriber system, the unique identifier identifying the set of data as cacheable;
    receiving a second message on the broker system from the publisher system, the second message having the unique identifier;
    sending the message with the identifier to the subscriber system;
    retrieving the set of data from a cache at the subscriber system; and
    replacing the unique identifier in the second message with the set of data to yield a completed message at the subscriber system.

2. The method of claim 1, further comprising the broker system and the publisher system each caching the set of data.

3. The method of claim 1, further comprising:
    the publisher system receiving the unique identifier; and
    the publisher system caching the unique identifier.

4. The method of claim 3, further comprising:
    the publisher system identifying data in a new message to be generated as the set of data;
    the publisher system generating the second message with the unique identifiers appearing in the second message in place of the set of data; and
    the publisher system sending the second message to the broker system.

5. The method of claim 1, the potential being identified based on an appearance of the set of data in at least one message received prior to the first message.

6. The method of claim 1, the broker system, the publisher system, and the subscriber system each being computerized systems in the pub/sub messaging environment.

7. The method of claim 1, the broker system, the publisher system, and the subscriber system communicating over at least one type of computer network.

8. A system for caching potentially repetitive message data in a publish-subscription (pub/sub) messaging environment, comprising:
    a first bus;
    a first processor coupled to the first bus; and
    a first memory medium coupled to the first bus, the first memory medium comprising instructions to:
        evaluate a publication rate of messages pertaining to a set of topics;
        identify a set of data in a first message received on a broker system from a publisher system, the set of data having a potential to appear in at least one future message based on the set of data pertaining to at least one topic of the set of topics, the at least one topic of the set of topics having a higher publication rate than other topics of the set of topics;
        send a unique identifier corresponding to the set of data from the broker system to the publisher system and a subscriber system, the unique identifier identifying the set of data as cacheable;
        receive a second message on the broker system from the publisher system, the second message having the unique identifier;
        send the message with the unique identifier to the subscriber system;
        retrieve the set of data from a cache at the subscriber system; and
        replace the unique identifier in the second message with the set of data to yield a completed message at the subscriber system.

9. The system of claim 8, the first memory medium further comprising instructions to cache the set of data on the broker system and the subscriber system.

10. The system of claim 8, further comprising:
    a second bus;
    a second processor coupled to the second bus; and
    a second memory medium coupled to the second bus, the second memory medium comprising instructions to:
        receive the unique identifier; and
        cache the unique identifier on the publisher system.

11. The system of claim 10, the second memory medium further comprising instructions to:
    identify data in a new message to be generated as the set of data;
    generate the second message with the unique identifiers appearing in the second message in place of the set of data; and
    send the second message to the broker system.

12. The system of claim 8, the potential being identified based on an appearance of the set of data in at least one message received prior to the first message.

13. The system of claim 8, the broker system, the publisher system, and the subscriber system each being computerized systems in the pub/sub messaging environment.

14. The system of claim 8, the broker system, the publisher system, and the subscriber system communicating over at least one type of computer network.

15. At least one computer program product for caching potentially repetitive message data in a publish-subscription (pub/sub) messaging environment, the at least one computer program product comprising at least one non-transitory computer readable storage medium, and program instructions stored on the at least one computer readable storage medium, to:
    evaluate a publication rate of a set of types of messages;
    identify a set of data in a first message received on a broker system from a publisher system, the set of data having a potential to appear in at least one future message based on the set of data pertaining to at least one type of the set of types of messages, the at least one type of the set of types of messages having a higher publication rate than other types of messages of the set of types of messages;

send a unique identifier corresponding to the set of data from the broker system to the publisher system and a subscriber system, the unique identifier identifying the set of data as cacheable;

receive a second message on the broker system from the publisher system, the second message having the unique identifier;

send the message with the unique identifier to the subscriber system;

retrieve the set of data from a cache at the subscriber system; and replace the unique identifier in the second message with the set of data to yield a completed message at the subscriber system.

16. The at least one computer program product of claim 15, further comprising program instructions stored on the at least one non-transitory computer readable storage medium to cache the set of data on the broker system and the subscriber system.

17. The at least one computer program product of claim 15, further comprising program instructions stored on the at least one non-transitory computer readable storage medium to:
receive the unique identifier on the publisher system; and
cache the unique identifier on the publisher system.

18. The at least one computer program product of claim 17 further comprising program instructions stored on the at least one non-transitory computer readable storage medium to:
identify data in a new message to be generated as the set of data on the publisher system;
generate the second message with the unique identifiers appearing in the second message in place of the set of data on the publisher system; and
send the second message to the broker system from the publisher system.

19. The at least one computer program product of claim 15, the potential being identified based on an appearance of the set of data in at least one message received prior to the first message.

20. The at least one computer program product of claim 15, the broker system, the publisher system, and the subscriber system each being computerized systems in the pub/sub messaging environment.

21. The at least one computer program product of claim 15, the broker system, the publisher system, and the subscriber system communicating over at least one type of computer network.

22. A method for deploying a system for caching potentially repetitive message data in a publish-subscription (pub/sub) messaging environment, comprising:
deploying at least one computer infrastructure being operable to:
evaluate a publication rate of a set of types of messages;
identify a set of data in a first message received on a broker system from a publisher system, the set of data having a potential to appear in at least one future message based on the set of data pertaining to at least one type of the set of types of messages, the at least one type of the set of types of messages having a higher publication rate than other types of messages of the set of types of messages;
send a unique identifier corresponding to the set of data from the broker system to the publisher system and a subscriber system, the unique identifier identifying the set of data as cacheable;
receive a second message on the broker system from the publisher system, the second message having the unique identifier;
send the completed message and the unique identifier to the subscriber system;
retrieve the set of data from a cache at the subscriber system; and
replace, at the subscriber system, the unique identifier in the second message with the set of data to yield a completed message.

23. The method of claim 22, the at least one computer infrastructure further being operable to cache the set of data on the broker system and the subscriber system.

24. The method of claim 22, the at least one computer infrastructure further being operable to:
receive the unique identifier on the publisher system; and
cache the unique identifier on the publisher system.

25. The method of claim 24, the at least one computer infrastructure further being operable to:
identify data in a new message to be generated as the set of data on the publisher system;
generate the second message with the unique identifiers appearing in the second message in place of the set of data on the publisher system; and
send the second message to the broker system from the publisher system.

* * * * *